(12) United States Patent
Menardo et al.

(10) Patent No.: US 12,460,755 B2
(45) Date of Patent: Nov. 4, 2025

(54) ROTATING JOINT DEVICE FOR A FLUID ENERGY EXPLOITATION INSTALLATION, OFFSHORE PLATFORM TYPE, AND INSTALLATION COMPRISING SUCH A DEVICE

(71) Applicant: ETI GROUP, Gemenos (FR)

(72) Inventors: Philippe Menardo, Beaulieu-sur-Mer (FR); Charles Capon, Aix-En-Provence (FR); Laurent Saint-Michel, Aubagne (FR)

(73) Assignee: ETI GROUP, Gemenos (FR)

( * ) Notice: Subject to any disclaimer, the term of this patent is extended or adjusted under 35 U.S.C. 154(b) by 0 days.

(21) Appl. No.: 18/481,049

(22) Filed: Oct. 4, 2023

(65) Prior Publication Data

US 2024/0117906 A1 Apr. 11, 2024

(30) Foreign Application Priority Data

Oct. 5, 2022 (FR) ........................................ 2210182

(51) Int. Cl.
*F16L 27/08* (2006.01)
(52) U.S. Cl.
CPC ................ *F16L 27/0804* (2013.01)
(58) Field of Classification Search
CPC . F16L 27/0804; F16L 27/0845; F16L 27/161; F16L 17/035
See application file for complete search history.

(56) References Cited

U.S. PATENT DOCUMENTS

| 2012/0146293 A1 | 6/2012 | Reeb et al. | |
| 2019/0085979 A1* | 3/2019 | Mattoni | F16J 15/3284 |
| 2019/0085980 A1* | 3/2019 | Mattoni | F16J 15/3232 |

FOREIGN PATENT DOCUMENTS

| DE | 19916107 A1 | 10/2000 |
| DE | 102017122269 A1 | 3/2019 |
| EP | 3460296 A1 | 3/2019 |

OTHER PUBLICATIONS

Liu, Sheng-fa et al., Single-point mooring underwater fluid swivel joint, Nov. 24, 2020, CN 111981219 A.*
Saint-Michel Laurent et al., Rotary joint device configured to equip a fluid exploitation installation, in particular on an offshore platform, Oct. 2, 2020, FR 3094444 A1.*
Search Report for FR Application No. 2210182 dated Mar. 24, 2023, 9 pages.

* cited by examiner

*Primary Examiner* — Zachary T Dragicevich
*Assistant Examiner* — James A Linford
(74) *Attorney, Agent, or Firm* — NIXON & VANDERHYE

(57) ABSTRACT

A rotary joint device of an installation for exploiting energy includes a first annular part that is secured to a fixed mooring turret of the installation, a second annular part rotatably movable about an axis of rotation and in relation to the first fixed annular part and that is secured to a movable ship of the installation, and at least one dynamic sealing member housed inside a gap space located between the first fixed annular part and the second movable annular part and provided with a body portion and with at least one first lip that projects from the body portion. Also described is an energy exploitation installation including such a rotary joint device.

15 Claims, 3 Drawing Sheets

ROTATING JOINT DEVICE FOR A FLUID ENERGY EXPLOITATION INSTALLATION, OFFSHORE PLATFORM TYPE, AND INSTALLATION COMPRISING SUCH A DEVICE

TECHNICAL FIELD OF THE INVENTION

The invention relates to installations for exploiting energy, in particular fluids and for example hydrocarbons or gas, or electricity, on platforms of offshore type, and in particular rotary joint devices used in such installations.

STATE OF THE ART

Rotary joint devices installed in installations under pressure may, inter alia, be applicable in oil production ships in the offshore field, making it possible to exploit hydrocarbon fields at sea. Floating production, storage and offloading units may be formed by a ship that is movable, due to its environment, around a mooring turret that is geostationary. The ship may be temporarily secured to the turret. The installations may comprise pipes that form a network of underwater pipes and that enable fluidic communication for a transfer of fluid between the bottom of the sea and the ship.

To ensure sealing between the ship and the turret and thus ensure the integrity of the fluid transfer, rotary joint devices are provided with a first part, known as fixed, secured to the turret and with a second part, known as movable, secured to the ship. The second part of the rotary joint devices is therefore rotatably movable in relation to the first part of the rotary joint devices. The rotary joint devices are further provided with a plurality of dynamic sealing members, known as dynamic seals, disposed in spaces arranged between the first fixed part and the second movable part of the rotary joint devices. Such dynamic sealing members may comprise for example lips having the function of ensuring sealing against fluid.

It is known from patent application EP 3 460 296 a dynamic sealing member provided with a body portion, with a first lip and with a second lip that each extend from the body portion and facing one another. The dynamic sealing member is further provided with at least one additional lip located at the body portion opposite the first and second lips. The first and second lips are configured to be energised by a first fluid so as to seal at least one of the first and second parts, whereas the at least one additional lip is configured to be energised by a second fluid so as to seal at least the other of the first part and second part.

DISCLOSURE OF THE INVENTION

The invention relates to a rotary joint device of an installation for exploiting energy, in particular fluids and for example hydrocarbons or gas, or electricity, in particular on an offshore platform, which is particularly effective while being simple, practical and economical.

Thus, the object of the invention, under a first aspect, is a rotary joint device of an installation for exploiting energy, in particular fluids and for example hydrocarbons or gas, or electricity, in particular on an offshore platform, comprising a first annular part that is secured to a fixed mooring turret of said installation, a second annular part rotatably movable about an axis of rotation X and in relation to said first fixed annular part and that is secured to a movable ship of said installation, and at least one dynamic sealing member housed inside a gap space located between said first fixed annular part and said second movable annular part and provided with a body portion and with at least one first lip that projects from the body portion.

Such a rotary joint device therefore comprises a first annular part, known as fixed, and a second annular part, known as movable, and the second annular part is rotatably movable about an axis of rotation X and in relation to said first fixed annular part.

Such a rotary joint device further comprises at least one dynamic sealing member, which is housed inside a gap space located between said first annular part and said second annular part. The at least one dynamic sealing member is in particular provided with a body portion and with at least one first lip that projects from the body portion.

In addition, the first fixed annular part is secured to a fixed mooring turret of the energy exploitation installation, and the second movable annular part is secured to a movable ship of said energy exploitation installation.

According to an interesting feature, the dynamic sealing member comprises two parts, a first of the two parts of the dynamic sealing member comprises at least one first body portion part and the first lip that projects from said first body portion part, and a second of the two parts of the dynamic sealing member comprises at least one second body portion part.

Forming the dynamic sealing member in two parts, with two different body portion parts, makes it possible to limit the phenomenon of damaging the body portion, which may lead to a breakage of the body portion.

The dynamic sealing member is therefore formed of two parts that are different from one another.

According to an interesting example, the first part of the body portion and the second part of the body portion are symmetrical.

For example, the first part of the dynamic sealing member and the second part of the dynamic sealing member are symmetrical.

According to an interesting feature, the dynamic sealing member comprises at least one reinforcing lug.

Such a lug may also be designated rib, or reinforcement.

The reinforcing lug is configured to limit shear stresses in the body portion.

For example, the reinforcing lug projects from an outer face of the body portion, at a distance from the edges of the outer face.

For example, the reinforcing lug extends substantially in the middle of the outer face.

For example, the reinforcing lug projects facing at least the first lip.

In the context of a dynamic sealing member in two parts, the reinforcing lug comprises for example at least one part that projects from the first part of the body portion, at a distance from and facing at least one first lip.

According to an interesting feature, the first lip of the dynamic sealing member comprises a root whereby it is connected to the body portion, and a free edge opposite the root, the free edge being provided with a circumferential bead.

Circumferential designates a bead going around the dynamic sealing member, i.e. going along the free edge of the first lip, it being reminded that such a dynamic sealing member is generally globally annular in a free state.

The bead is for example formed on a face of the first lip configured to be pressed against a wall of a housing receiving at least partly the dynamic sealing member.

For example, the circumferential bead comprises a radial notch.

Here, radial designates a notch extending from a centre of the dynamic sealing member.

The notch is therefore for example orthogonal to the free edge of the first lip.

The radial notch is for example configured to balance a fluid pressure that would be introduced into the housing, on either side of the circumferential bead.

Thus, the notch makes an isostatic balance possible.

Such a fluid under pressure is configured to activate the dynamic sealing member, for example to initiate the initial sealing. It replaces for example a spring commonly used to press the first lip against a wall of the housing wherein it is inserted.

According to an interesting feature, at least one edge between an inner face of the body portion, opposite an outer face from which at least the first lip extends, and a lateral surface of the body portion in contact with a wall of the housing wherein the body portion is at least partly inserted, comprises at least one bevel or one rounded section.

In other words, at least one inner edge of the body portion is bevelled or rounded.

Thus, for example when the dynamic sealing member is inserted, at least partially, into a housing with at least the first lip towards a bottom of the housing, an edge of the housing arrives on an upper or lower lateral surface of the dynamic sealing member. Thanks to the rounded or bevelled shape of the inner edge of the body portion, a risk of forming a bead, when the gap space located between said first fixed annular part and said second movable annular part is reduced, is limited or even avoided, and a risk that the bead becomes pinched, or even crushed, between the first fixed annular part and the second movable annular part, is also reduced, or even avoided.

The bevel or the rounded section is for example configured so that the edge is located at least at a limit from the bevel or from the rounded section, at the lateral surface, when the dynamic sealing member is placed in the housing, and that the gap space is at its maximum.

Thus, for example, the edge is out of contact with the lateral surface of the body portion. It is therefore possible to limit, or even avoid, a risk of forming a bead by a part of the body portion when the gap space is reduced and/or a risk that the edge nicks the dynamic sealing member.

Moreover, a surface of the body portion in contact with the wall of the housing is then reduced.

It is thus possible to maximise a pressure on the dynamic sealing member and therefore produce an improved sealing.

The interesting features described above may be considered as aspects of the original invention per se, but may also be combined, in whole or in part.

According to an example of embodiment, the dynamic sealing member comprises a second lip.

For example, the second lip projects from the second part of the body portion.

For example, the second lip extends facing the first lip.

If the dynamic sealing member comprises a reinforcing lug, the latter is for example disposed between the first lip and the second lip.

For example, it is disposed at equal distance from the first lip and from the second lip. According to an example of embodiment, at least one of the first fixed annular part or of the second movable annular part comprises the housing wherein the dynamic sealing member is at least partially received.

The housing is for example a groove hollowed out in at least one of the first fixed annular part or of the second movable annular part, from a face of the first fixed annular part or of the second movable annular part, between which the gap space is defined.

For example, the inner face of the body portion is in contact with a wall of the housing, i.e. pressed against a wall of the housing.

According to an example of embodiment, the inner face of the body portion is in contact with the first fixed annular part.

For example, the housing is formed, at least partly, in the second movable annular part. According to an example of embodiment, a wall of the housing forms a bearing on which at least one part of the first lip, and in particular at least the circumferential bead, comes into contact.

According to an example of embodiment, the housing is arranged so that the body portion is received in a position globally orthogonal to the axis of rotation and the first lip extends globally in line with the body portion.

According to an example of implementation, the rotary joint device comprises at least one transfer chamber at least partially arranged in said first fixed annular part and/or in said second movable annular part to make it possible to transfer fluid through said rotary joint device, with the gap space that opens into said at least one transfer chamber, and with the dynamic sealing member disposed in the vicinity of the transfer chamber.

The dynamic sealing member, in such a layout, ensures a sealing of the transfer chamber.

According to another example of implementation, the dynamic sealing member may also be used in a rotary joint device.

For example, it may be used to seal a mechanism for guiding the first and second annular parts, which mechanism is generally formed by bearing members. It might be said that it is a bearing seal.

It may also be used as an environmental seal, i.e. it is located as far as possible from the transfer chamber, for example towards one end of the first fixed annular part and/or from the second movable annular part, opposite the transfer chamber.

Another object of the invention, under another aspect, is an installation for exploiting energy, in particular fluids and for example hydrocarbons or gas, or electricity, and in particular on an offshore platform, comprising at least one rotary joint device such as described above.

Such an electricity exploitation installation comprises for example a wind farm.

A fluid circulating in the rotary joint device then comprises for example water, gas, oil or other.

BRIEF DESCRIPTION OF THE FIGURES

According to an example of embodiment, the invention will be fully understood and its advantages will become clearer upon reading the following detailed description, given by way of indicative and non-limiting example, with reference to the appended drawings, wherein.

DETAILED DESCRIPTION

Figure 1:
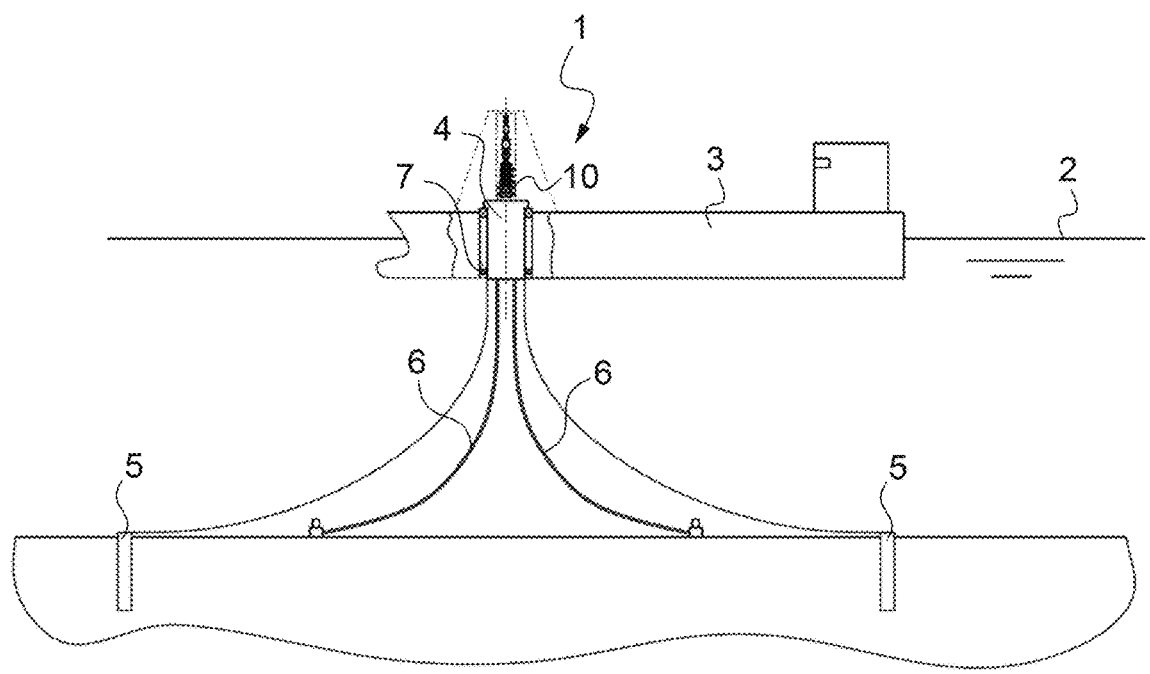
FIG. 1 schematically and partially represents an installation for exploiting energy, in particular fluids and for example hydrocarbons or gas, on an offshore platform, provided with a ship, a mooring turret, a network of underwater pipes enabling fluidic communication for the transfer of fluid between the bottom of the sea and the ship, and a rotary joint device ensuring sealing between the ship and the turret and the integrity of the transfer of fluids.

FIG. 1 illustrates an installation for exploiting energy 1, in particular fluids and for example hydrocarbons or gas, on an offshore platform, making it possible to exploit hydrocarbon fields at sea 2.

This installation 1, also called floating production, storage and offloading unit, may be provided with a ship 3 that is movable, due to its environment formed by the sea 2, and a mooring turret 4 that is geostationary and around which the ship 3 is movable.

The mooring turret 4 may for example be mechanically secured to the bottom of the sea 2 via underwater anchors 5.

The ship 3 may be movable in relation to the mooring turret 4 by way of a bearing mechanism 7.

The installation 1 may be provided with pipes 6 that form a network of underwater pipes enabling fluidic communication for the transfer of fluid between an underwater deposit then the mooring turret 4, and the ship 3.

The fluid circulating in the pipes 6 comes from the bottom of the sea 2.

The installation 1 comprises a rotary joint device 10 ensuring sealing between the ship 3 and the mooring turret 4 and the integrity of the transfer of fluids.

Figure 2:
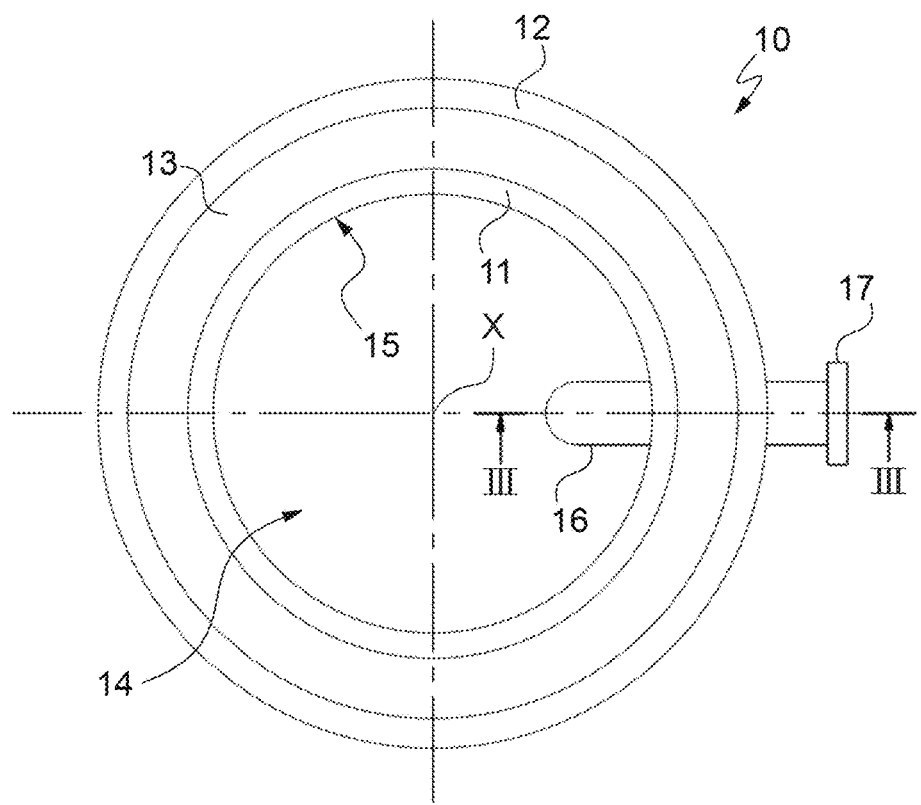
FIG. 2 is a top view of the rotary joint device of the installation illustrated in FIG. 1.

The rotary joint device 10 may be formed of a swivel device or of a swivel stack device. Thus as illustrated in FIG. 2, such a rotary joint device 10 is globally annular and comprises a first annular part 11, known as fixed, that is configured to be secured to the mooring turret 4, as well as a second annular part 12, known as movable, which is configured to be secured to the ship 3.

In the example described, the second annular part 12 is rotatably movable in relation to the first annular part 11, by means of a bearing member 13 at least partially interposed between the first and second annular parts 11 and 12.

The rotary joint device 10 has an inner space 14 defined here by an inner surface 15 of the first annular part 11.

The installation 1 further comprises a transfer pipe 16 connected, directly or indirectly, to at least one of the underwater pipes 6.

The transfer pipe 16 enters the rotary joint device 10 through its inner space 14 and opens to the outside of the rotary joint device 10 via an outlet connection 17.

The transfer pipe 16 thus passes through the rotary joint device 10 by entering into the first annular part 11 and by exiting by the second annular part 12.

Figure 3:
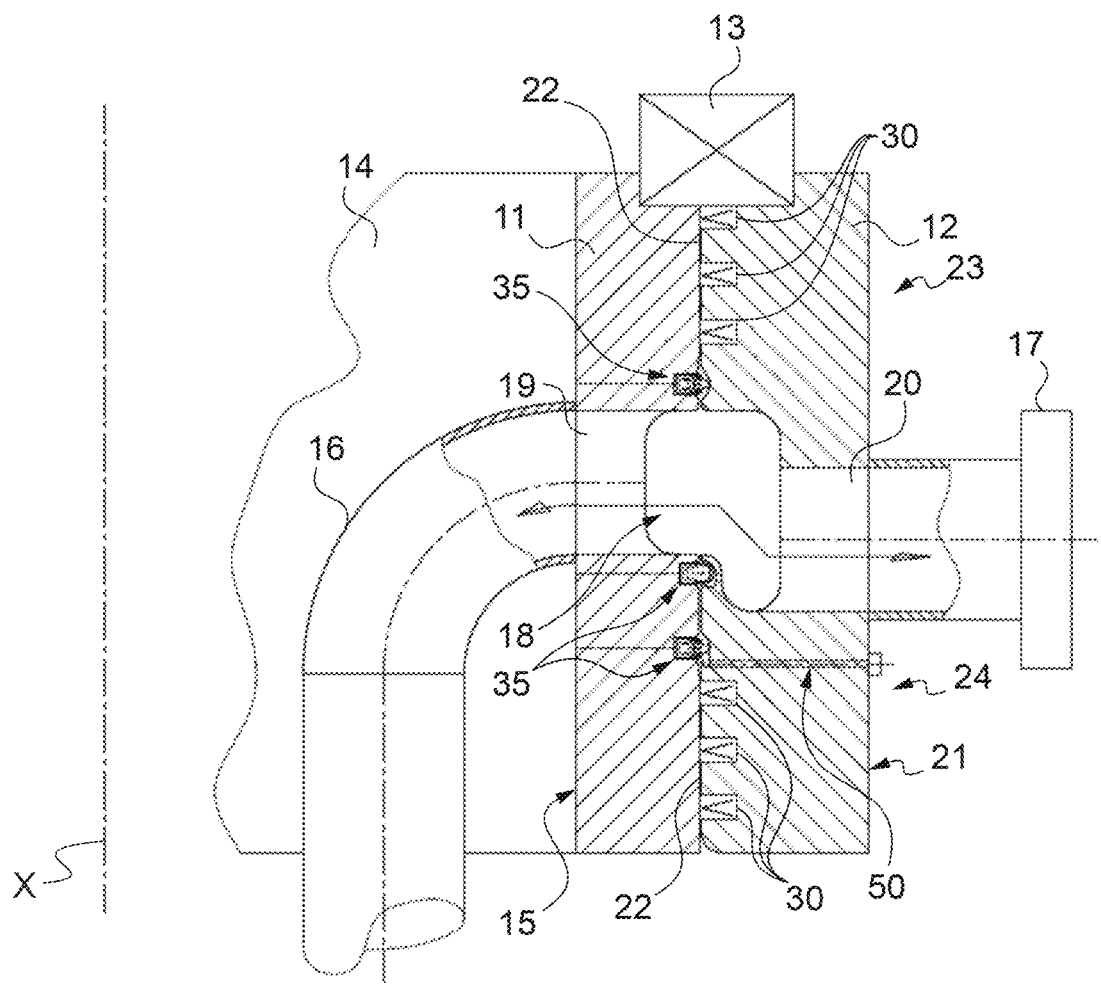
FIG. 3 is a partial sectional view of the rotary joint device, referenced III-Ill in FIG. 2.

FIG. 3 shows in section the rotary joint device 10 of FIG. 2 and illustrates in more detail the fluidic path through the rotary joint device 10 and the cooperation between the first and second annular parts 11 and 12.

The rotary joint device 10 is provided with a transfer chamber 18 partially formed by a first hole 19 arranged in the first annular part 11 and by a second hole 20 arranged in the second annular part 12 and at least partially facing the first hole 19.

The transfer chamber 18 here is annular, or toroidal.

The first hole 19 opens at the inner surface 15 of the first annular part 11 in a first portion of the transfer pipe 16 located in the inner space 14 of the rotary joint device 10 and that is connected to the underwater pipes 6.

The second orifice 20 opens at an outer surface 21 of the second annular part 12 in a second portion of the transfer pipe 16 located outside of the rotary joint device 10 and that comprises the outlet connection 17.

An arrow illustrated in FIG. 3 shows the fluidic path taken by the fluid coming from the pipes 6 and transported by the transfer pipe 16 by passing through the first and second annular parts 11 and 12 of the rotary joint device 10, up to the outlet connection 17.

The rotary joint device 10 is further provided with a gap space 22 located between the first annular part 11 and the second annular part 12.

The gap space 22 is provided to enable the rotation of the second annular part 12 in relation to the first annular part 11.

In the example described, the gap space 22 is interrupted by the transfer chamber 18. Thus, on an upper portion 23 of the rotary joint device 10, the gap space 22 extends from the bearing member 13 until it opens into the transfer chamber 18; whereas on a lower portion 24 of the rotary joint device 10, the gap space 22 opens to one end in the transfer chamber 18 and opens to one end opposite the outside of the rotary joint device 10. Here, the transfer chamber 18 is interposed between the upper 23 and lower 24 portions. In particular, the gap space 22 is arranged between an outer surface of the first annular part 11, which outer surface is opposite its inner surface 15, and an inner surface of the second annular part 12, which inner surface is opposite its outer surface 21.

The rotary joint device 10 comprises dynamic sealing members 30 housed at least partially inside the gap space 22, in the upper and lower portions 23 and 24 of the rotary joint device 10.

These dynamic sealing members 30 are provided to seal the gap space 22.

These dynamic sealing members 30 may comprise for example lips having the function of ensuring sealing against fluid.

In the example described, three dynamic sealing members 30 are housed at least partially inside the gap space 22 in the upper portion 23 of the rotary joint device 10 and three dynamic sealing members 30 are housed at least partially inside the gap space 22 in the lower portion 24 of the rotary joint device 10.

Here, the rotary joint device 10 further comprises a plurality of devices for protecting 35 the dynamic sealing members 30.

Alternatively, there may be more or less of them and not necessarily the same number in the upper and lower portions.

In the example described, a protection device 35 is housed at least partially inside the gap space 22 in the upper portion 23 of the rotary joint device 10 and two protection devices 35 are housed at least partially inside the gap space 22 in the lower portion 24 of the rotary joint device 10.

The rotary joint device 10 may also comprise a cleaning device 50 configured to remove the debris that said fluid may comprise and that here is formed by a channel formed in the second annular part 12 and that opens into the gap space 22 at the protection device 35.

Alternatively, there may be more or less protection devices and/or cleaning devices, or none at all.

FIGS. 4 to 8 illustrate a dynamic sealing member 30 according to an example of embodiment of the present invention.

A dynamic sealing member 30 is generally globally annular in a free state.

The axis X therefore here represents an axis of revolution of the dynamic sealing member 30.

Figure 4:
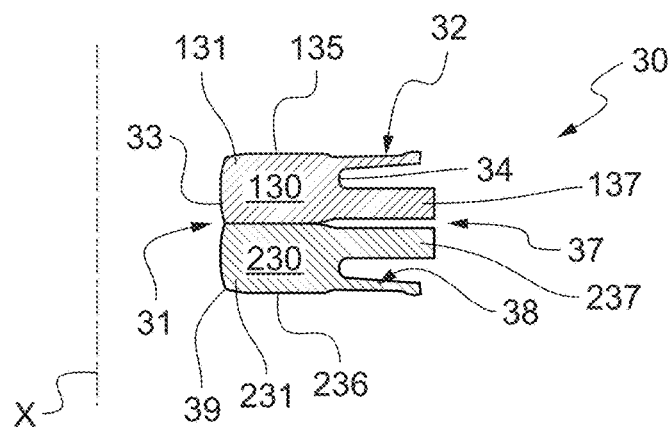
FIG. 4 schematically represents a section of a dynamic sealing member according to one embodiment of the invention.

FIG. 4 shows, in section, the dynamic sealing member 30.

As the dynamic sealing member 30 is globally annular, the section represented in FIG. 4 corresponds to a section taken according to a plane radial to the axis X.

In the example of embodiment presented in FIGS. 4 to 8, the dynamic sealing member 30 comprises a body portion 31 and at least one first lip 32 that projects from the body portion 30. Here, it further comprises a second lip 38 that also projects from the body portion 30, facing the first lip 32.

The body portion 31 comprises an inner face 33, oriented towards the axis X, and an outer face 34 from where the first and second lips 32, 38 extend.

On either side, the body portion 31 comprises an upper lateral surface 135 and a lower lateral surface 236 connecting the inner face 33 to the outer face 34.

According to an interesting feature, the dynamic sealing member 30 here comprises a reinforcing lug 37.

The reinforcing lug 37 projects from the outer face 34 of the body portion 31, at a distance from the edges of the outer face 34, i.e. at a distance from the upper 135 and lower lateral surfaces 236, and even here substantially in the middle of the outer face 34.

Here, the reinforcing lug 37 is arranged between the first lip 32 and the second lip 38, and at equal distance from the first lip 32 and from the second lip 38.

According to another interesting feature, the body portion 31 has at least one edge located between the inner face 33 of the body portion 31 and at least one of the upper lateral surface 135, or of the lower lateral surface 236, of the body portion 31, which edge comprises at least one bevel or one rounded section 39.

In other words, at least one inner edge of the body portion 31, or even both inner edges, is/are bevelled or rounded.

According to another interesting feature, the dynamic sealing member 30 here comprises two parts 130, 230, designated for convenience first part 130 and second part 230.

The dynamic sealing member is therefore here formed of two parts 130, 230 that are different from one another.

The first part 130 and the second part 230 are here symmetrical in relation to a median plane of the dynamic sealing member 30.

A median plane designates here a plane orthogonal to the axis X, in other words of which the axis X forms a normal.

Consequently, the body portion 31 of the dynamic sealing member 30 comprises a first body portion part 131 and a second body portion part 231.

Thus, in the example illustrated, the first part 130 comprises the first body portion part 131 of the body portion 31, as well as the first lip 32 that projects from said first body portion part 131, and the second part 230 comprises the second body portion part 231 of the body portion 31, as well as the second lip 38 that projects from said second body portion part.

Here, due to the two-part structure of the dynamic sealing member, the reinforcing lug 37 also comprises two parts 137, 237, the first part 130 of the dynamic sealing member 30 comprising the first part 137 of the reinforcing lug 37 whereas the second part 230 of the dynamic sealing member 30 comprises the second part 237 of the reinforcing lug 37.

Figure 5:
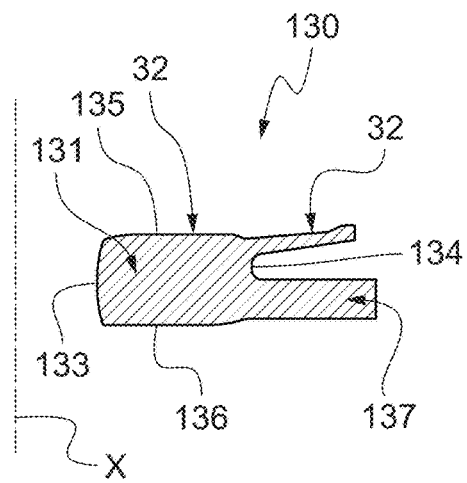
FIG. 5 schematically represents a section of a first part of a dynamic sealing member according to an example of embodiment of the invention.

FIG. 5 shows in more detail, in section the first part 130 of the dynamic sealing member 30.

The first body portion part 131 comprises an inner face 133, which is a first part of the inner face 33 of the dynamic sealing member 30, an outer face 134, which is a first part of the outer face 34 of the dynamic sealing member 30, from where the first lip 32 extends, as well as the upper lateral surface 135 connecting on one side, known as upper, the inner face 133 and the outer face 134.

Between the inner face 133 and the outer face 134, and opposite the upper lateral surface 135, the first body portion part 131 comprises a lower surface 136 configured to come to press against the second part 230 of the dynamic sealing member 30. As illustrated in FIG. 5, the first part 137 of the reinforcing lug 37 more particularly extends from the inner face 134, in an extension of the lower surface 136.

At least one part of the lug 137 differs from the first lip 32 in that it has a greater thickness, and therefore rigidity.

Figure 6:
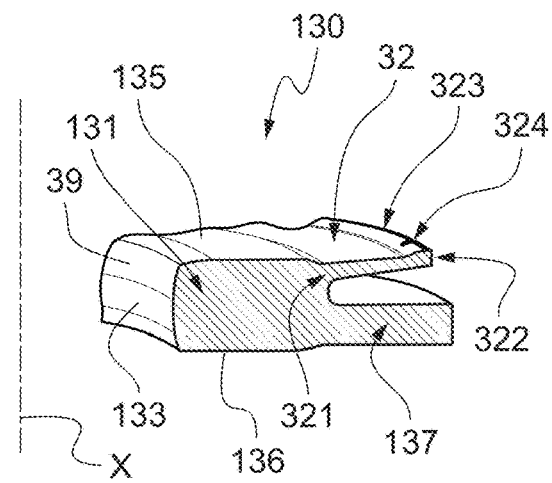
FIG. 6 is a perspective view of the first part of a dynamic sealing member of FIG. 5.

As best shown in FIG. 6, the first lip 32 of the dynamic sealing member 30 comprises a root 321 whereby it is connected to the body portion 31, and more particularly here to the first body portion part 131, and a free edge 322 opposite the root 321.

The free edge 322 here is provided with a circumferential bead 323.

Circumferential indicates that the bead 323 goes around the dynamic sealing member 30, here by going along the free edge 323 of the first lip 32.

The bead 323 here is formed on a face of the first lip 32, in particular on the side of its upper face, i.e. on the face located in an extension of the upper lateral surface 135. Furthermore, the circumferential bead 323 here comprises a radial notch 324.

Radial means that the notch is extending from a centre of the dynamic sealing member, i.e. according to a radial plane in relation to the axis X.

The notch 324 here is therefore orthogonal to the free edge 322 of the first lip 32.

As best shown in FIG. 6, in the present example of embodiment, the inner surface 133 of the first body portion part 131 is also substantially bevelled or rounded in its edge formed between the inner face 133 and the lower surface 136.

As the second part 230 is symmetrical to the first part 130, the description above is identical for the second part 230 and will not be repeated in detail. The references are the same added with 100 and the following description of the arrangement of the dynamic sealing member 30 in a housing 400 will refer to the first part 130 and to the second part 230.

Figure 7:
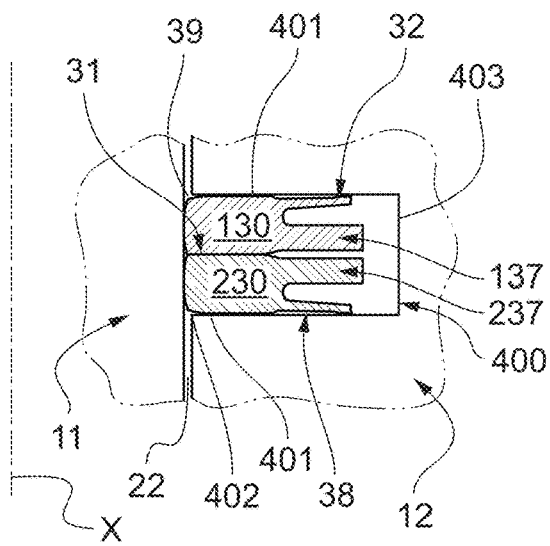
FIG. 7 represents a part of a device according to an example of embodiment of the invention comprising a dynamic sealing member according to an example of embodiment of the invention, disposed in a housing of the rotary joint device, in a rest position.
Figure 8:
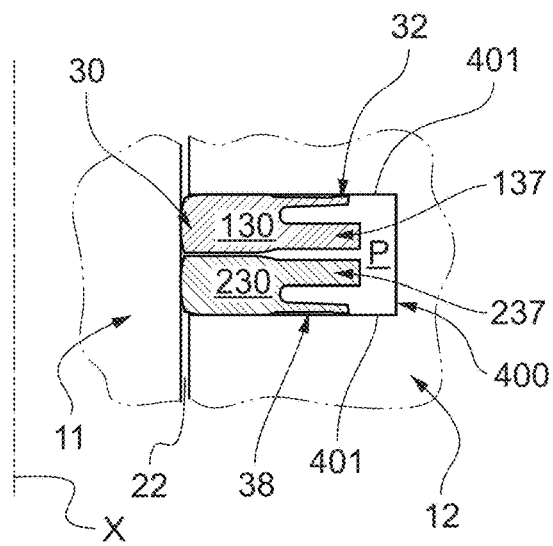
FIG. 8 represents the device part of FIG. 7 with a pressure applied in the housing.

In the example of embodiment of FIGS. 7 and 8 the second movable annular part 12 comprises a housing 400 wherein the dynamic sealing member 30 is at least partially received.

Alternatively, the housing may be arranged in a first fixed annular part.

The housing 400 comprises a lateral wall 401 forming a bearing, and a bottom 403.

The housing is for example a groove hollowed out, here in the second movable annular part 12, from an inner face of the second movable annular part that defines, with an outer face of the first fixed annular part, the gap space 22.

An intersection edge between the lateral wall 401 and the inner face of the second movable annular part 12 thus forms an edge 402 of the housing 400.

The dynamic sealing member 30 is received in the housing 400 as illustrated in FIGS. 7 and 8.

The inner face 33 of the body portion 31 here is in contact with the first fixed annular part 11. In addition here, the housing 400 is arranged so that the body portion 31 is received in a position globally orthogonal to the axis of rotation X and the first lip extends globally in line with the body portion.

The upper lateral surface 135 and the lower lateral surface 236 are then pressed against the wall 401 of the housing 400.

The lateral wall 401 of the housing forms a bearing on which at least one part of the first lip 32 and of the second lip 38, and in particular at least the circumferential bead 323, comes into contact, it being understood that the second lip 38 may be identical, by symmetry, to the first lip 32 and therefore may also be provided with such a bead, possibly provided also with a notch.

During operation of the rotary joint device, the radial notch thus enables fluid that would be introduced into the housing 400, to pass through, on either side of the circumferential bead 323.

Such an operation is illustrated in FIG. 8.

The fluid under pressure P is configured to activate the dynamic sealing member 30, for example to initiate the initial sealing.

Thanks to the radial notch, there is not necessarily the need of an additional spring to press the first lip 32, as well as the second lip 38, against the wall 401 of the housing 400.

Thus, as illustrated in FIG. 8 by comparison with FIG. 7, applying such a pressure tends to press the first and second lips 32, 38 against the wall 401 of the housing 400, as well as to substantially move the first part 137 and the second part 237 of the reinforcing lug 37 away from one another.

Moreover, when the dynamic sealing member 30 is inserted, at least partially, into the housing 400, with at least the first lip 32 towards the bottom 403 of the housing 400, as illustrated in FIGS. 7 and 8, the upper lateral surface 135 and/or the lower lateral surface 236 is in the immediate vicinity of the edge 402 of the housing 400.

When the gap space 22 is at its maximum, the bevel or the rounded section 39 is preferably configured so that the edge 402 is located at least at a limit from the bevel or from the rounded section 39, at the upper 135 or lower lateral surface 236 of the body portion.

Thus for example, the edge 402 is out of contact with the upper 135 or lower lateral surface 236 of the body portion.

Moreover, a surface of the body portion in contact with the wall of the housing is then reduced. It is thus possible to maximise a pressure on the dynamic sealing member and therefore produce an improved sealing.

The gap space 22 increases with the pressure between said first fixed annular part 11 and said second movable annular part 12, and the gap space 22 reduces when this pressure decreases between the first fixed annular part 11 and the second movable annular part 12.

When the gap space 22 increases, the pressure P in the housing may cause a formation of a bead from the body portion of the dynamic sealing member, which may be pinched when the gap space 22 reduces.

In the present example of embodiment according to the invention, thanks to the rounded section or bevel 39 of the inner edge of the body portion 31, a risk of forming a bead in the gap space 22 is limited or even avoided, and consequently a risk that the bead becomes pinched, or even crushed, between the first fixed annular part 11 and the second movable annular part 12, is also reduced, or even avoided.

It will also be noted that thanks to the substantially bevelled or rounded shape of the inner surface 133 of the first body portion part 131 in its edge formed between the inner face 133 and the lower surface 136, respectively of the inner surface of the second body portion part 231 in its edge formed between the inner face and the lower surface, the risks of catching between the two parts of the dynamic sealing member 30 when they are inserted into the housing 400 are reduced.

The housing 400 including a dynamic sealing member 30 comprising all or some of the features described above may be located in the rotary joint device as illustrated in FIG. 3 in the vicinity of the transfer chamber 18.

The dynamic sealing member 30, in such a layout, ensures a sealing of the transfer chamber.

According to another example of implementation, the dynamic sealing member may also be used in a rotary joint device.

For example, it may be used to seal a mechanism for guiding the first and second annular parts, which mechanism is generally formed by bearing members. It might be said that it is a bearing seal.

It may also be used as an environmental seal, i.e. that it is located as far as possible from the transfer chamber, for example towards one end of the first fixed annular part and/or from the second movable annular part, opposite the transfer chamber.

The invention claimed is:

1. A rotary joint device of an installation for exploiting energy, the rotary joint device comprising:
   a first annular part that is secured to a fixed mooring turret of said installation;
   a second annular part rotatably movable about an axis of rotation and in relation to said first fixed annular part and that is secured to a movable ship of said installation; and
   at least one dynamic sealing member housed inside a gap space located between said first fixed annular part and said second movable annular part and provided with a body portion and with at least one first lip that projects from the body portion, the at least one dynamic sealing member comprising two parts, a first of the two parts of the at least one dynamic sealing member comprising at least one first body portion part of the body portion, and the first lip that projects from said first body portion part, and a second of the two parts of the at least one dynamic sealing member comprising at least one second body portion part of the body portion,
   wherein at least one of the first fixed annular part and the second movable annular part comprises a housing in which the at least one dynamic sealing member is at least partially received, and
   wherein at least one edge between an inner face of the body portion, opposite an outer face from which at least the first lip extends, and a lateral surface of the body portion in contact with a wall of the housing in which the body portion is at least partially inserted, comprises at least one bevel or one rounded section.

2. The rotary joint device according to claim 1, wherein the at least one dynamic sealing member comprises at least one reinforcing lug, the reinforcing lug projecting from an outer face of the body portion, at a distance and facing at least the first lip.

3. The rotary joint device according to claim 2, wherein the first lip of the at least one dynamic sealing member comprises a root connected to the first body portion part, and a free edge opposite the root, the free edge being provided with a circumferential bead that comprises a radial notch.

4. The rotary joint device according to claim 3, wherein the at least one dynamic sealing member comprises a second lip,
wherein the second lip projects from the second body portion part, and
wherein the second lip extends facing the first lip.

5. The rotary joint device according to claim 4, wherein the inner face of the body portion is in contact with the first fixed annular part.

6. The rotary joint device according to claim 5, wherein the wall of the housing forms a bearing on which at least one part of the first lip comes into contact.

7. The rotary joint device according to claim 6, wherein the housing is disposed so that the body portion is received in a position orthogonal to the axis of rotation and the first lip extends in line with the body portion.

8. The rotary joint device according to claim 7, further comprising at least one transfer chamber at least partially disposed in one or more of said first fixed annular part and said second movable annular part to enable fluid transfer through said rotary joint device, with the gap space that opens into said at least one transfer chamber, and with the dynamic sealing member disposed in the vicinity of the transfer chamber.

9. The rotary joint device according to claim 1, wherein the first lip of the at least one dynamic sealing member comprises a root connected to the first body portion part, and a free edge opposite the root, the free edge being provided with a circumferential bead that comprises a radial notch.

10. The rotary joint device according to claim 1, wherein the at least one dynamic sealing member comprises a second lip,
wherein the second lip projects from the second body portion part, and
wherein the second lip extends facing the first lip.

11. The rotary joint device according to claim 1, wherein the inner face of the body portion is in contact with the first fixed annular part.

12. The rotary joint device according to claim 1, wherein the wall of the housing forms a bearing on which at least one part of the first lip comes into contact.

13. The rotary joint device according to claim 1, wherein the housing is disposed so that the body portion is received in a position orthogonal to the axis of rotation and the first lip extends in line with the body portion.

14. The rotary joint device according to claim 1, further comprising at least one transfer chamber at least partially disposed in one or more of said first fixed annular part and said second movable annular part to enable fluid transfer through said rotary joint device, with the gap space that opens into said at least one transfer chamber, and with the dynamic sealing member disposed in the vicinity of the transfer chamber.

15. An installation for exploiting energy, comprising:
the rotary joint device according to claim 1.

* * * * *